No. 897,392. PATENTED SEPT. 1, 1908.
K. OKAZAKI.
NITROGENOUS FOOD PRODUCT.
APPLICATION FILED MAR. 13, 1907.
SPECIMENS.
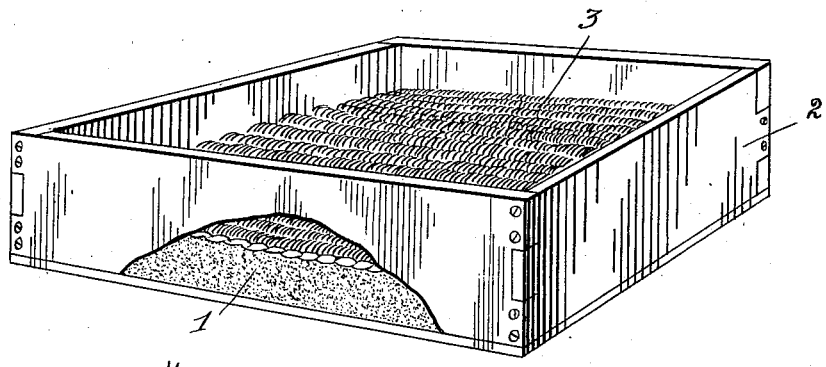
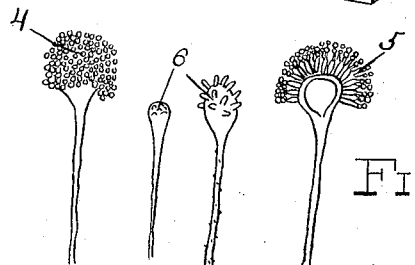
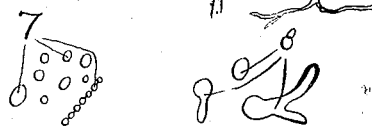
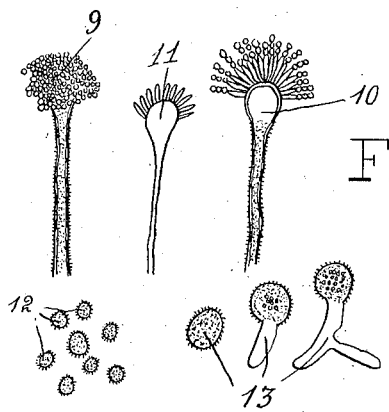
Witnesses
J. Milton Jester
Myron G. Cleap
Inventor
Keiichiro Okazaki
By B. Singer
Attorney

UNITED STATES PATENT OFFICE.

KEIICHIRO OKAZAKI, OF TOKYO, JAPAN, ASSIGNOR OF ONE-HALF TO HANUEMON YENJO, OF TOKYO, JAPAN.

NITROGENOUS FOOD PRODUCT.

No. 897,392.   Specification of Letters Patent.   Patented Sept. 1, 1908.

Application filed March 13, 1907. Serial No. 362,157.

*To all whom it may concern:*

Be it known that I, KEIICHIRO OKAZAKI, a subject of the Emperor of Japan, and a resident of Tokyo, Japan, have invented certain new and useful Improvements in Nitrogenous Food Products, of which the following is a specification.

This invention relates to an improved process of manufacturing nitrogenous food compounds from such vegetable refuse matter as the bran or hulls of grains, or pressed cakes, remaining after the removal of the liquid constituents, as oils, from seeds, and the like, by the action of a certain fungus or mold hereinafter designated as "Okazaki" fungus which appears on steamed rice bran which has been left for a considerable length of time in the air. The mold which thus forms on the bran or hulls of rice is removed, with as little foreign matter as possible, and is transplanted on the medium to be transformed thereby, as the bran of cereals or desiccated pressed cake and either pulverized pumice-stone or sponge. By the action of the "Okazaki" fungus, a large quantity of insoluble nitrogenous compounds in the material treated is converted into soluble and assimilable compounds, producing nitrogenous nutrient compositions.

In the accompanying drawing forming a part of this specification Figure 1 is a perspective of a box containing sawdust and bran used in the cultivation of the "Okazaki" fungus. Fig. 2 is a perspective view of the "Okazaki" fungus and conidia thereof and Fig. 3 is a perspective view of the diastarin fungus and conidia thereof.

The present invention consists of three stages, viz: the cultivation of the fungus mold herein designated as "Okazaki" fungus, the preparation of fungus-malt known as "koji" therewith and the infusion of nitrogenous compounds as hereinafter described.

In the cultivation of the "Okazaki" fungus fine soft wood shavings or sawdust is mixed with rice bran and the mixture 1 is placed in a box 2 of the character shown in Fig. 1 of the drawing and steamed until the starch contained in it is reduced to a gelatinous state. The bran mixture is then allowed to cool until the temperature falls to about 30° C. when it is covered with fresh rice straw or mats 3, woven therefrom, as illustrated, and placed in a warm chamber where a temperature of from 20° to 35° C. is maintained. When the mold or fungus has made a suitable growth which occurs in about 24 hours, the bran is removed to a shallow box in which the material has a depth of about one inch, and is afterwards divided into a number of boxes for facility in handling, the bran having a depth of about one inch in said boxes. In two or three days the mold or fungus will be perfectly developed. Examined under the microscope the mass is found to contain, besides "Okazaki" fungus, *Aspergillus oryzæ, monilia,* mucor, diastarin fungus and yeasts. The "Okazaki" fungus is then separated from other kind of fungi by repeatedly cultivating it on steamed bran or it may be produced free from other fungi by the ordinary process of preparing pure culture.

"Okazaki" fungus is a hitherto unknown species and belongs to the genus *Aspergillus*, being found in rice bran. This fungus is illustrated in Fig. 2 of the accompanying drawing in which 4 shows the conidiophore the end being covered with conidia. 5 shows the conidiophore with the end covered with radially ramified sterigmata on which the conidia are formed. 6 shows two young conidiophores, the more mature one of the two exhibiting granulation on its walls. 7 shows the conidia magnified somewhat more highly than the conidiophores and 8 illustrates the germination of the conidia, the latter being likewise more highly magnified than the conidiophores illustrated. The aerial mycelium of the Okazaki fungus has septa and produces short conidiophores the ends of which are swollen into a round or bar-shaped head and upon the whole surface or only on the upper side of that head ramified cylindrical or flask-shaped sterigmata are formed. The end of each sterigma is constricted into conidia, presenting bead-like appearance. The conidia in young culture are pure white, but they assume faint yellowish color when it becomes old. Though allied to *Aspergillus oryzæ*, "Okazaki" fungus can therefore be easily distinguished from it. In whiteness "Okazaki" fungus resembles *As-*

*pergillus albus*, but the former can be easily distinguished from the latter by its yellowish color in old culture, by the difference of temperature suitable for growth, and by the power of dissolving proteid matters.

"Okazaki" fungus grows in ordinary temperature on gelatin, agar-agar or steamed rice, the most favorable temperature for its growth being about 28° or 30° C.

The Okazaki fungus somewhat closely resembles the diastarin fungus which likewise occurs on rice straw and from which the former must be separated. For purposes of comparison and to avoid confusion in separating the Okazaki fungus from the diastarin fungus, I have illustrated the latter in Fig. 3 as it appears under a microscope. In this figure, 9 is the conidiophore, the end being covered with conidia. 10 shows the conidiophore with the end covered with radiating sterigmata on which the conidia are formed. 11 is a young conidiophore. 12 shows the conidia magnified somewhat more highly than the conidiophores and 13 illustrates the germination of the conidia, the latter being likewise more highly magnified than the conidiophore.

Although both the diastarin fungus and the Okazaki fungus belong to the genus *Aspergillus*, they are easily distinguishable from each other. The important distinctive differences between these two species may be thus tabulated:

| | Okazaki fungus. | Diastarin fungus. |
| --- | --- | --- |
| 1. Color of conidia | Snow white | Greenish-yellow. |
| 2. Size of conidia | 2.5-5.4 Micron. | 8-9 Micron. |
| 3. Conidiophore | Short and with wall smooth and granulated. | Long and with wall finely granulated. |
| 4. Sterigmata | Ramified | Non-ramified. |
| 5. Power of dissolving starch. | Weak | Strong. |
| 6. Power of dissolving proteid substances. | Strong | Weak. |
| 7. Flavor of the culture. | Agreeable | No peculiar flavor. |

During its growth the Okazaki fungus secretes one or more enzymes exhibiting the properties of very powerful cytase, diastase, peptase, lipase etc. It is believed that one enzyme only is produced. This readily dissolves starch, cellulose and proteid matters and saponifies fat, far more readily than *Aspergillus oryzæ*. I have proposed the name of "digestin" for this powerful enzyme to distinguish it from others already known.

The action of the peptase in digestin is especially powerful, and when the mold is cultivated at the ordinary temperature on solidified gelatin, containing 2% of table salt, or 0.2% of hydrochloric acid or 2% of sodium carbonate, they are all liquefied in six or seven days when placed in a warm room, showing how powerful is its power of resistance to the acid and alkaline media and to neutral salt. The enzyme obtained from the infusion readily dissolves elastin, mucin, casein, fibrin, egg-albumen, nuclein, etc., and decomposes them.

In the preparation of the fungus-malt "koji" there is added to the culture medium comprising the hulls or bran of grain, or pressed cake and porous materials as sponge or pumice, prepared as hereinafter described, a culture of "Okazaki" fungus which converts the mass into perfect "koji" if properly supplied with air and kept at a temperature of about 30° C. for several days. A culture medium containing besides phosphoric acid, potash and other mineral matters, a large amount of saccharine and albuminous matters is especially suited for the growth of "Okazaki" fungus, as such a medium accelerates the formation of the "koji". As the fungus grows it secretes an enzyme which is a powerful digestive agent, which acts on the raw materials and decomposes the albumen thereof into such soluble nitrogenous compounds as albumose, peptone, amido acids, and other amides. At the same time the insoluble phosphates which are combined with the albumen and other matters are made soluble, the starch is converted into sugars, the fat is saponified and the cellulose is also rendered soluble.

It is to be understood that the "koji" hereinbefore mentioned consists of liquid decomposition products produced by the action of the "Okazaki" fungus on the culture medium employed and that it is associated with a residue of unconverted solids.

In the infusion of nitrogenous compounds from the material produced as hereinbefore described, I proceed as follows: To the "koji" preparation prepared as above described I add a diffusible liquid such as warm water or weak alcohol, say of 20% purity, or glycerin and the whole is well mixed; then the porous material as sponges or pumice-stone contained in the "koji" preparation is removed and the liquid is left to stand for about eighteen hours with occasional stirring at a temperature of about 40° to 50° C. Satisfactory results may be obtained by adding equal parts by weight of the diffusible liquid to the "koji" preparation, although the proportions may be widely varied. The soluble nitrogenous compounds, soluble phosphates, glucose, soluble saccharine matters, etc., contained in the "koji" are extracted and held in solution in the liquid. This mass is then pressed and filtered and the filtrate is desiccated at a low temperature of say 60° C. under diminished atmospheric pressure, producing a nitrogenous nutrient composition of great dietetic value for use alone, as a readily digested food or for use with other foods, as meats, to facilitate the digestion thereof. The product is a yellowish white hydroscopic powder which dissolves in water, the solution having a turbid appearance. In use it may be employed alone, dissolved in about ten times its weight of water, or it may be added to other foods as a digestive agent. It is particularly well adapted for addition to foods containing starch, casein and albumen. By its use in proportions of from 2 per cent. upward gelatin, legumen and casein are converted into soluble form in which they may be readily digested and assimilated.

The following is an example of an advantageous method of use of the product above mentioned: Dissolve gelatin in hot milk using any desired proportions, equal parts by weight being particularly satisfactory and let the solution stand until it cools down to a temperature of 40° C. Then add a small quantity, say from 2 to 6 per cent. of my product and stir thoroughly. The gelatin and the casein of the milk will soon be so thoroughly liquefied that the solution will not coagulate even when it is thoroughly cooled, and will give no precipitate with nitric acid. This preparation forms a liquid food somewhat similar to a thin soup.

Nitrogenous nutrient compositions at present known, as somatose, meat peptone, etc. all comprise either meat with an addition of a digestive ferment such as pepsin to render them digestible or they are made by evaporating the liquid remaining after the preparation of pepsin. In the production of such compositions costly materials are used and the resulting products are generally found to contain only nitrogenous materials with no digestive enzymes present. At best, only a small quantity of pepsin is obtained in such compositions. At the same time the process of preparation is very complicated and costly. In the present invention not only are waste vegetable matters such as the bran or hulls of grain or pressed cake used as raw materials, but, by the utilization of the peculiar mold or fungus hereinbefore referred to nitrogenous nutrient compositions containing strong enzymes and soluble phosphates are prepared by a simple and inexpensive process.

"Okazaki" fungus is distinguishable by its quality or property of easily dissolving phosphates, starch, cellulose, proteids, etc. The industrial application of this property for the preparation of nitrogenous nutrient is believed to be novel and such application constitutes an important factor in the present invention.

Formerly "koji" has been formed from brans or pressed cakes, but the formation of "koji" of this description could not develop into a profitable industry owing to various obstacles in the process, such as the lumping together of the materials into a gelatinous mass owing to the absorbing of a large quantity of water while being steamed; the unequal diffusion of vapors in consequence and the partial putrefaction of the materials during the process. In my process porous materials such as sponges or pumice-stone are mixed with the bran or pressed cake used, water is sprinkled on the mixture, and the surface of the mass is coated with bran or pressed cake and then subjected to heat. The water held in the sponge or pumice keeps the bran or pressed cake moistened while being subjected to an elevated temperature and, as the sponge or pumice besides acting as a conductor of heat, enlarges the heated surface of the bran or pressed cake, the starch contained in it is reduced to a gelatinous state perfectly and uniformly. Upon this material "Okazaki" fungus is cultivated and the "koji" is obtained; both being easily and perfectly formed owing to the extended space for the growth of fungus and the proper supply of moisture and air.

Having fully described my invention, I claim:

1. A process of producing a nitrogenous food composition which consists in steaming rice hulls until the starch contained therein is reduced to a gelatinous state, cooling to a temperature favorable to fungus growth bringing rice straw into proximity thereto, maintaining the hulls at this temperature for several days, separating the "Okazaki" fungus from other fungi developed, cultivating the "Okazaki" fungus upon a medium of nitrogenous vegetable material mixed with porous material and moistened with water, for several days at a temperature favorable to fungus growth, then adding a readily diffusible liquid to the mass, separating the liquid content from said mass and evaporating said liquid to dryness at a temperature below 100° C.

2. A process of producing a nitrogenous food composition which consists in steaming rice hulls having porous material mixed therewith until the starch contained therein is reduced to a gelatinous state, cooling the hulls to a temperature of between about 20° and 35° C., planting fungi from rice straw thereon maintaining the hulls at this temperature for several days, separating the "Okazaki" fungus from the other fungi developed, cultivating this fungus upon a medium comprising refuse nitrogenous material as pressed cake mixed with porous material and moistened with water, for several days at a temperature between about 20° and 35° C., then adding a readily diffusible liquid to the mass, separating the liquid portion of the mass and desiccating said liquid at a temperature below 100° C. under diminished atmospheric pressure.

3. In the process of producing a nitrogenous food composition, the herein described steps comprising cultivating upon a medium of nitrogenous vegetable material mixed with insoluble porous material substantially pure "Okazaki" fungus, a whitish fungus normally developed in a wild state on rice hulls at a temperature of between about 20° to 35° C., maintaining said vegetable material and fungus at a temperature favorable to fungus growth for several days, adding a readily diffusible liquid to the mass, separating the liquid portion of the mass and desiccating it substantially as described.

In testimony whereof I affix my signature in presence of two witnesses.

KEIICHIRO OKAZAKI.

Witnesses:
R. S. MILLER,
M. NAMBER.